United States Patent
White et al.

[11] Patent Number: 5,524,030
[45] Date of Patent: Jun. 4, 1996

[54] MULTISTAGE CONTROL ROD DRIVE UNCOUPLING TOOL

[75] Inventors: Thomas W. White; Balasubramanian S. Kowdley; Thomas A. Lewis, all of San Jose; Christopher J. Miller, Campbell; Robert S. Tsukida, San Jose; Andrew S. Wong, Santa Clara, all of Calif.; Thomas R. Eckmann, Killen, Ala.; Edward W. Saxon; Frank Ortega, both of San Jose, Calif.

[73] Assignee: General Electric Company, San Jose, Calif.

[21] Appl. No.: 199,405

[22] Filed: Feb. 22, 1994

[51] Int. Cl.⁶ .................................................. G21C 19/00
[52] U.S. Cl. ................... 376/260; 376/216; 376/215; 376/217; 376/258; 376/259
[58] Field of Search ........................... 376/260, 216, 376/215, 217, 258, 259; 976/DIG. 242; 340/531, 542, 547

[56] References Cited

U.S. PATENT DOCUMENTS

| | | | |
|---|---|---|---|
| 3,594,740 | 7/1971 | Comeau | 340/188 |
| 3,846,771 | 11/1974 | Young et al. | 340/195 |
| 3,906,469 | 9/1975 | Kronic | 340/188 R |
| 3,919,043 | 11/1975 | Reid | 376/258 |
| 4,053,355 | 10/1977 | Vuckovich | 376/258 |
| 4,158,600 | 6/1979 | Akimoto et al. | 376/260 |
| 4,363,778 | 12/1982 | Abbott | 376/228 |
| 4,663,576 | 5/1987 | Scarola et al. | 318/685 |
| 4,927,594 | 5/1990 | Heibel et al. | 376/258 |

Primary Examiner—Donald P. Walsh
Assistant Examiner—Meena Chelliah
Attorney, Agent, or Firm—James E. McGinness

[57] ABSTRACT

An uncoupling tool has a two-module design: one module being a driver assembly for developing the uncoupling movement and the other module being a probe assembly for verifying the uncoupled condition. The probe assembly attaches to the threaded end of the piston tube with its probe extending inside the piston tube. The driver assembly attaches to the CRD ring flange. The probe assembly detects the ring magnet in the drive piston using analog position sensors which operate on the principle of the Hall effect and solid state circuitry. A top sensor provides a signal indicating that the control rod is in its "full out" position; a bottom sensor provides a signal indicating that the control rod is uncoupled; and an intermediate sensor provides a signal indicating that the control rod is in a transition position between the "full out" and uncoupled positions. The probe incorporates spacers which focus the magnetic flux onto the sensors. To uncouple the control rod, the probe assembly is lifted using a separate driver assembly.

17 Claims, 7 Drawing Sheets

MULTISTAGE CONTROL ROD DRIVE UNCOUPLING TOOL

FIELD OF THE INVENTION

This invention relates generally to maintenance of control rod drives in boiling water reactors. In particular, the invention relates to tools for uncoupling a control rod from a control rod drive prior to a maintenance operation.

BACKGROUND OF THE INVENTION

Figure 1:
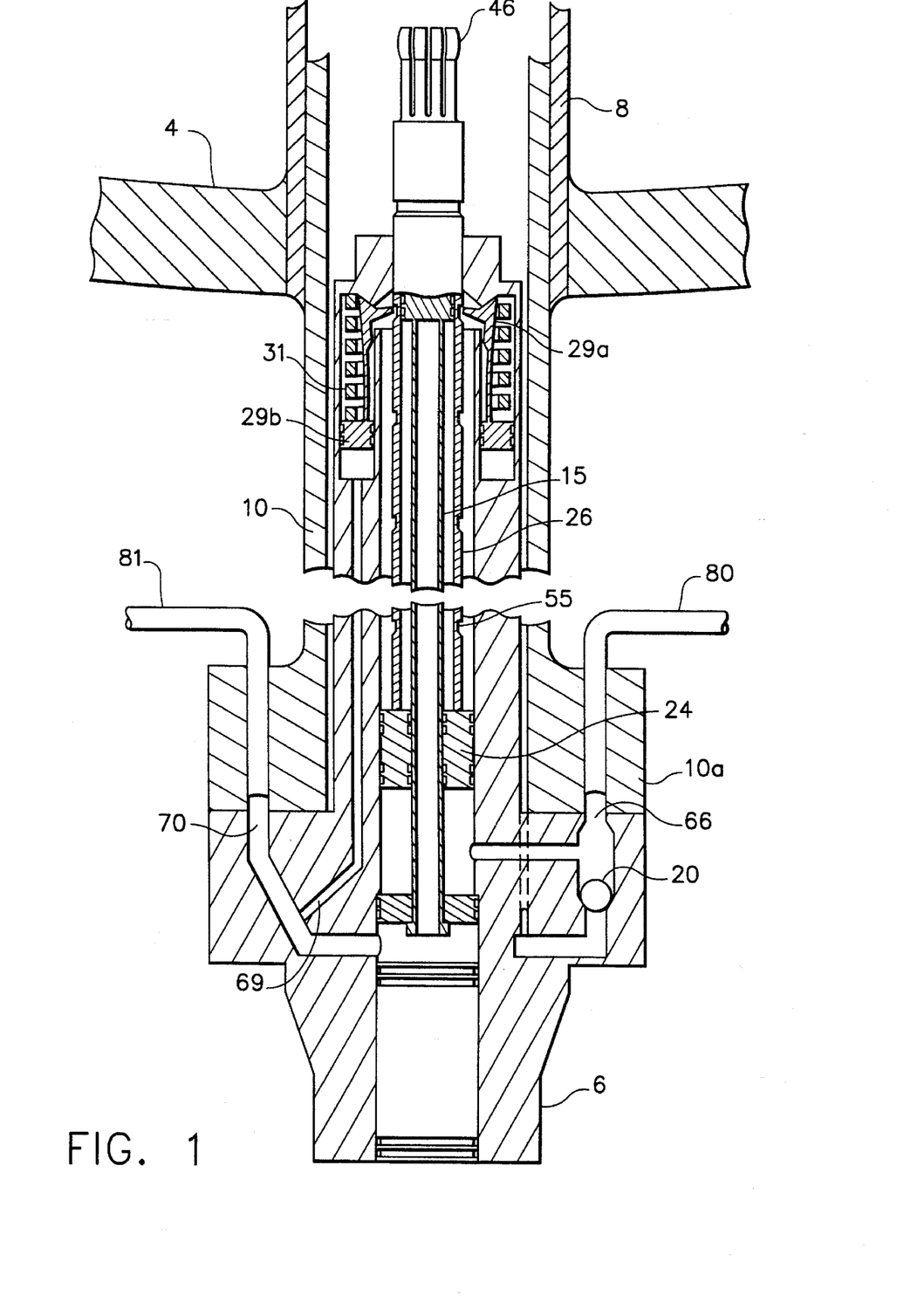
FIG. 1 is a sectional schematic of a conventional control rod drive installed in a BWR.

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4 mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains a withdraw port 70 and an insert port 66 with an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, the check valve directs external hydraulic pressure or reactor pressure to the underside of drive piston 24. When higher than the external hydraulic pressure, reactor pressure is admitted to the two-way check valve from the annular space between the CRD and a thermal sleeve (not shown) through passages in the CRD flange, called scram vessel ports.

Figure 2:
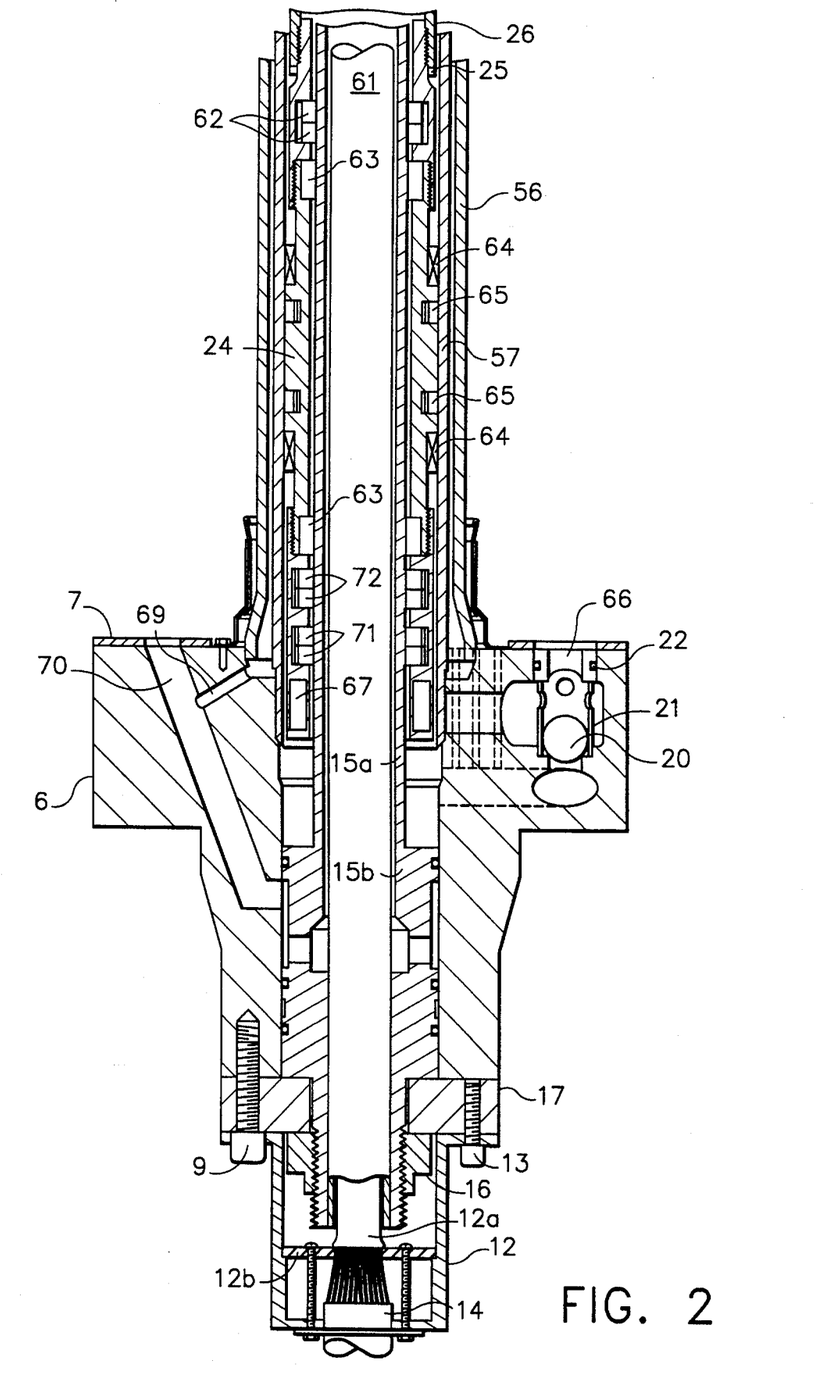
FIG. 2 is a sectional view of the lower portion of a conventional control rod drive.

Referring to FIG. 2, the CRD further comprises an inner cylinder 57 and an outer tube 56, which form an annulus under the collet piston 29b through which water is applied to the collet piston (see FIG. 1) to unlock index tube 26. The internal diameter of inner cylinder 57 is honed to provide the surface required for expanding seals 65 on the drive piston 24.

Returning to FIG. 1, welded pipes 80 and 81, installed in the CRD housing, port water to the insert port 66 and the withdraw port 70 respectively. A port 69 below outer tube 56 connects to withdraw port 70 in CRD flange 6 so that water is applied through the under-the-collet-piston annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus under the drive piston 24 and serves as the inlet for water during normal insertion or scram. Water enters this port for a brief period in response to a withdraw signal to move the index tube 26 upward so that collet fingers 29a (see FIG. 1) are cammed out. Following this brief unlocking period, water from below drive piston 24 is discharged through port 66 and through the under-piston hydraulic line for the duration of the withdraw signal.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism comprises collet fingers 29a, collet piston 29b and collet spring 31. This mechanism is the means by which index tube 26 is locked to hold the control rod at a selected position.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against a guide cap (not shown). When the withdraw signal ceases, the spring pressure forces the collet downward so that fingers 29a slip off the guide cap. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29b, providing 24 increments at which a control rod may be positioned and preventing inadvertent withdrawal of the rod from the core. The lower surfaces of the locking notches slope gradually so that the collet fingers cam outward for control rod insertion.

Figure 4:
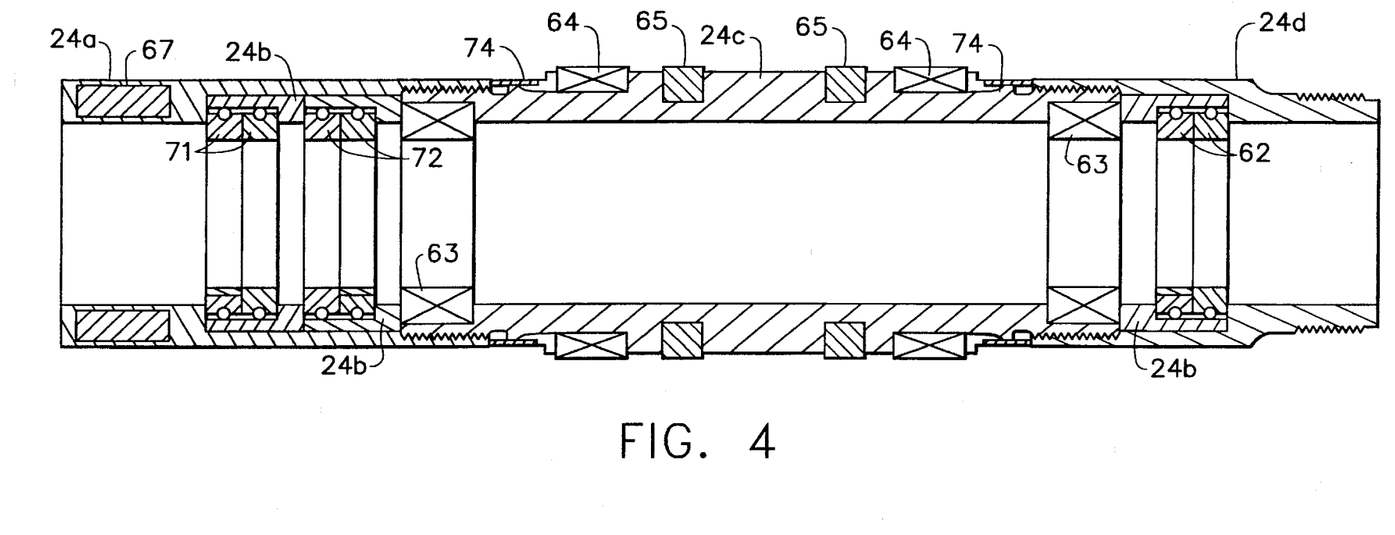
FIG. 4 is a sectional view of an assembled CRD drive piston.

The component parts of drive piston 24 are shown in FIG. 4 and include magnet housing 24a, seal cups 24b, piston coupling 24c and piston head 24d. Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively. The magnet housing 24a contains a ring magnet 67 which actuates the switches of the position indicator probe 12a to provide remote electrical signals indicating control rod position.

The piston tube assembly forms the innermost cylindrical wall of the CRD. It is a welded unit consisting of piston tube 15 and a position indicator tube 61 (see FIG. 2). The position indicator tube 61 is a pressure-containing part which forms a drywell housing for a position indicator probe 12a. Piston tube 15 provides for the porting of water to or from the upper end of the piston head portion of drive piston 24 during rod movement.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. A threaded end 15c of piston tube 15 is secured by a nut 16 at the lower end of the CRD.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to CRD ring flange 17 by cap screws 13. A cable clamp (not shown), located at the bottom of a receptacle 14, secures a connecting electrical cable to receptacle 14. Ring flange 17 is in turn secured to the CRD housing by screws 9. Thus, probe 12a, housing 12 and the cable clamp (with the cables passing therethrough) can be removed as a unit.

Probe 12a includes a switch support with 53 reed switches and a thermocouple for transmitting electrical signals to provide remote indications of control rod position and CRD operating temperature. The reed switches are connected by electrical wires to receptacle 14, which receives a plug (not shown). Housing 12 serves as a protective covering for the electrical wires. The reed switches are normally open and are closed individually during CRD operation by ring magnet 67 installed in the bottom of drive piston 24.

Figure 3:
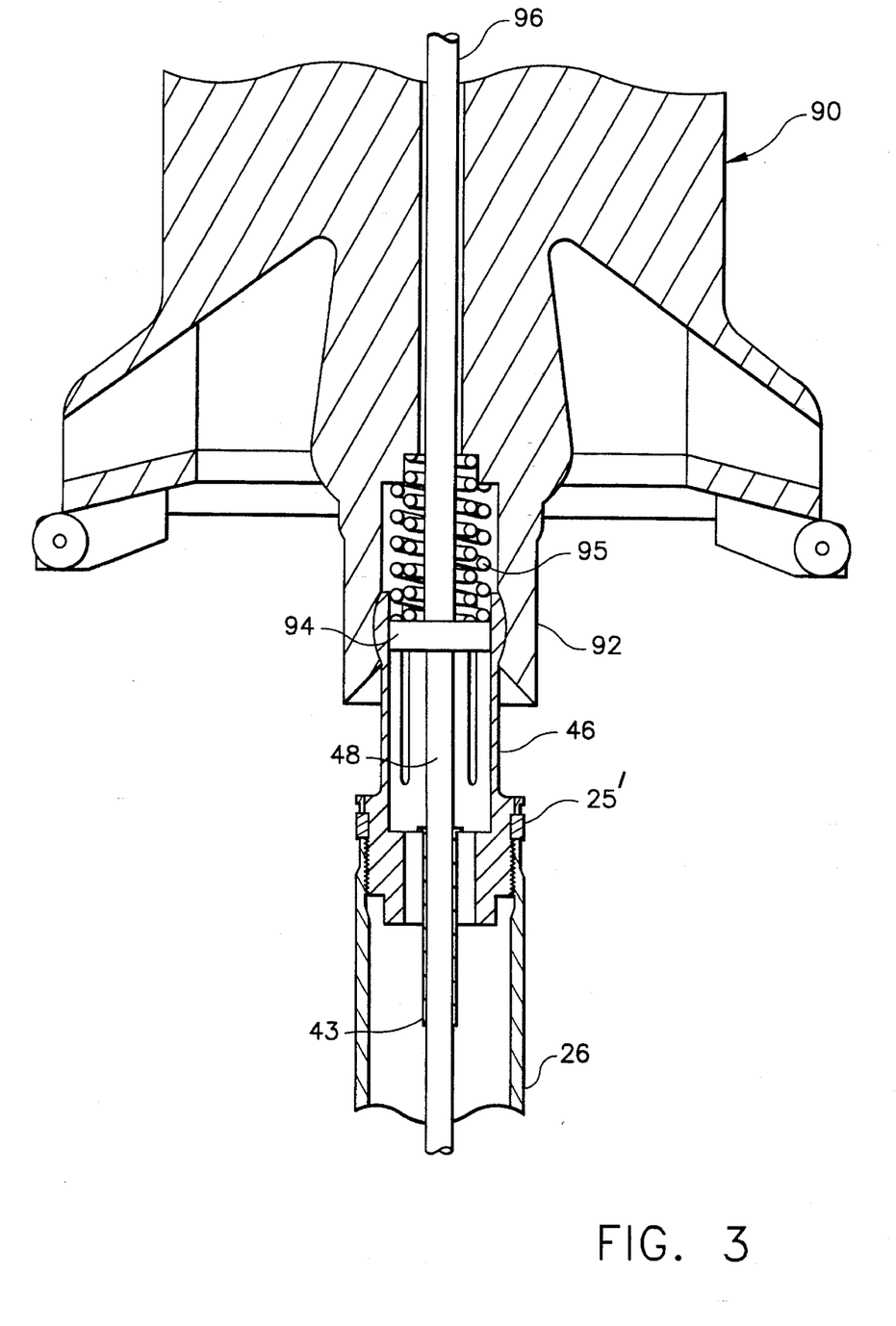
FIG. 3 is a sectional view of a conventional coupling of a control rod drive to a control rod.

As seen in FIG. 3, spud 46, which connects the control rod 90 and the CRD, is threaded onto the upper end of index tube 26 and held in place by locking band 25'. The coupling arrangement will accommodate a small amount of angular misalignment between the CRD and the control rod. Six spring fingers permit the spud to enter the mating socket 92 on the control rod. A lock plug 94 then enters spud 46 from socket 92 and prevents uncoupling.

Two uncoupling mechanisms are provided. The lock plug 94 may be raised against the return force of a spring 95 by an actuating shaft 96 which extends through the center of the control rod velocity limiter to an unlocking handle (not shown). The control rod, with lock plug 94 raised, may then be lifted from the CRD.

The lock plug may also be raised from below to uncouple the CRD from below the reactor vessel. Conventional practice is to remove the position indicator probe from the CRD prior to drive removal. The purpose is to allow access by an uncoupling tool in the space occupied by the probe. The uncoupling tool is used to uncouple the drive from the control rod from beneath the RPV. To accomplish this, an uncoupling tool is attached to the bottom of the CRD and used to raise the piston tube 15. Piston tube 15 supports an uncoupling rod 48 (shown in FIG. 3) which is welded to the flared end of a tube 43, which is in turn slidably supported in the base of spud 46.

When the control rod is in its "full-out" position, i.e., backseated position atop the guide tube (not shown), the drive piston is separated from piston head 15b by a distance of 2⅛ inches. Raising the piston tube and uncoupling rod 48 by 1⅛ inches lifts lock plug 94 out of the spud. The drive piston/index tube/spud assembly 24/26/46 is then withdrawn until the drive piston sits on the piston head 15b (i.e., a distance of 1 inch), thereby disengaging the spud from the control rod coupling socket 92 (i.e., uncoupling the control rod). The uncoupling tool is then lowered by 1⅛ inches to lower the control rod, assembly 24/26/46 and piston 15 together until piston head 15b is again backseated on the CRD ring flange 17. This is referred to as the overtravel travel position of the control rod.

A conventional uncoupling tool comprises a probe supported on a thrust bearing via a battery housing. A mounting frame has a threaded bore for receiving a drive screw, the end of which is coupled to the thrust bearing. To install the uncoupling tool on a CRD, the mounting frame is bolted to the CRD ring flange (17 in FIG. 2). Then the drive screw is turned using a handle until the thrust bearing bears against the bottom of threaded end (15c in FIG. 2) of the piston tube. Further turning of the handle causes the thrust bearing to push the piston tube assembly up, which in turn lifts the lock plug (94 in FIG. 3) and uncouples the control rod. This uncoupling tool has a mechanical reed switch inside the probe which changes state when the ring magnet in the magnet housing (24a in FIG. 4) moves into proximity therewith, i.e., during withdrawal of the drive piston assembly. This change in state activates an indicator lamp, thereby indicating that the control rod has been uncoupled from the control rod drive. When uncoupling has been verified by activation of the indicator, the control rod drive is ready to be removed from the CRD housing flange 10a.

SUMMARY OF THE INVENTION

The present invention is an improved multistage uncoupling tool having the capability to indicate if the CRD has drifted in after being uncoupled from the control rod. The uncoupling tool has a two-module design: one module being a driver assembly for developing the uncoupling movement and the other module being a probe assembly for verifying the uncoupled condition. The probe assembly attaches to the threaded end of the piston tube with its probe extending inside the piston tube. The driver assembly attaches to the CRD ring flange. The driver assembly has a drive screw which pushes the probe assembly and the piston tube assembly connected thereto upward to uncouple the control rod.

In accordance with a preferred embodiment of the invention, the probe assembly detects the ring magnet in the drive piston using analog position sensors which operate on the principle of the Hall effect and solid state circuitry. There are no moving parts. A plurality of analog position sensors are axially spaced inside the probe to provide a corresponding plurality of position indication signals. In accordance with a preferred embodiment, a top sensor provides a signal indicating that the control rod is in its "full out" position; a bottom sensor provides a signal indicating that the control rod is uncoupled; and an intermediate sensor provides a signal indicating that the control rod is in a transition position between the "full out" and uncoupled positions. The probe incorporates spacers which focus the magnetic flux onto the sensors.

To uncouple the control rod, the probe assembly is lifted using a separate driver assembly. The driver assembly includes a thrust bearing which bears against the base of the probe assembly, a mounting frame which is coupled to the CRD ring flange, and a drive screw which is threadably coupled to a threaded bore in the mounting frame and which supports the thrust bearing at one end. As the drive screw is turned, the probe assembly and piston tube assembly coupled thereto are lifted, thereby raising the lock plug to uncouple the control rod.

The uncoupling tool of the invention has improved reliability, repeatability and accuracy and is less sensitive to varying magnetic field strengths of magnet housing and to eccentric placement of the tool relative to the CRD.

BRIEF DESCRIPTION OF THE DRAWINGS

FIG. 8 is partial sectional views of the frame incorporated in the probe assembly.

DETAILED DESCRIPTION OF THE PREFERRED EMBODIMENTS

Figure 6:
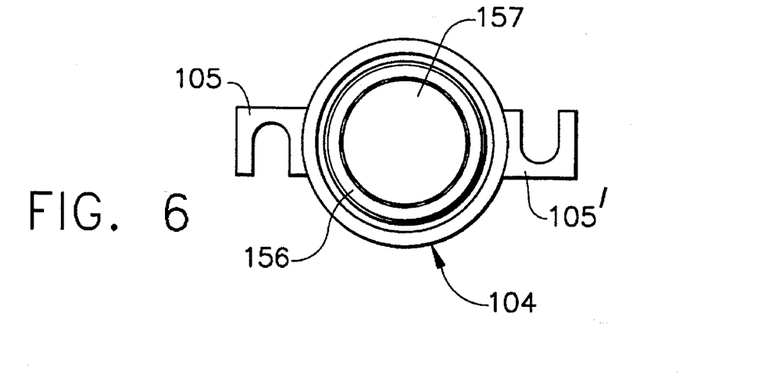
FIGS. 6 and 7 are partial sectional and top views, respectively, of the driver assembly.
Figures 7, 8B:
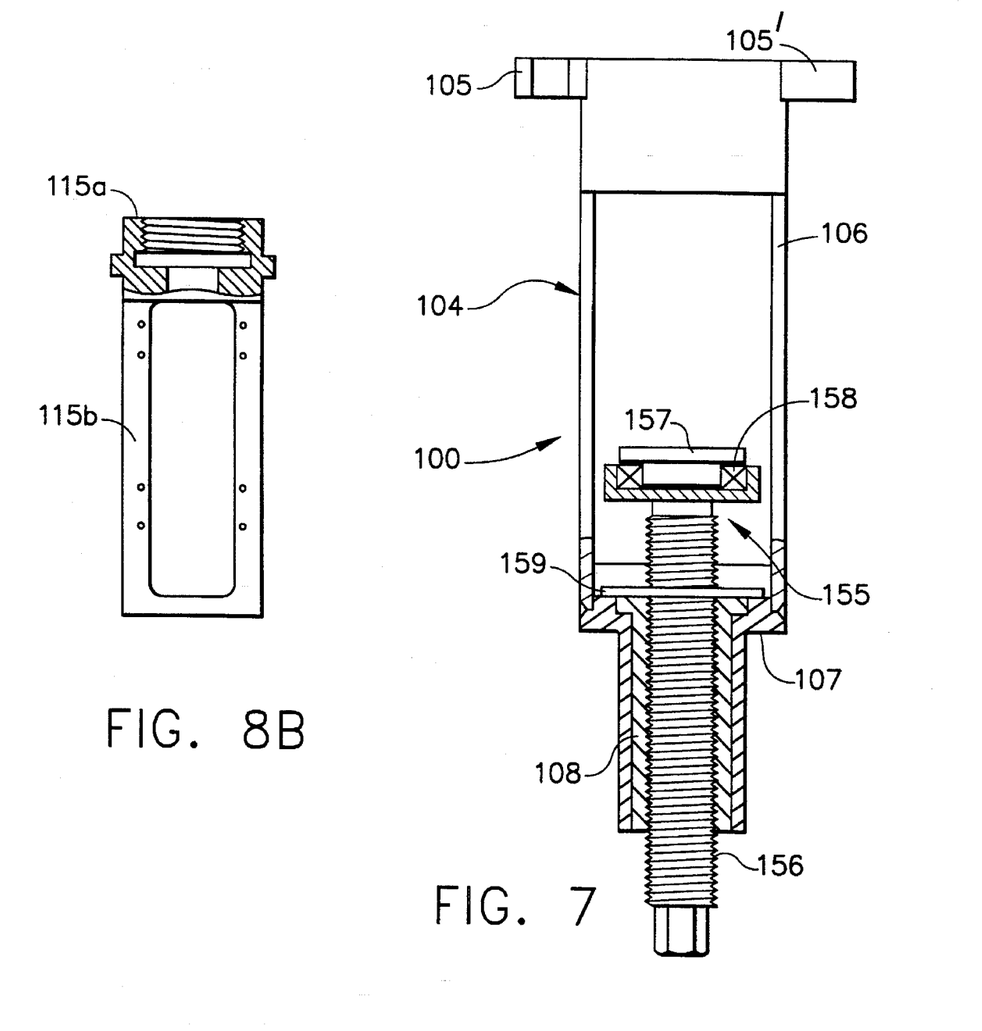

The driver assembly 100 (see FIGS. 6 and 7) consists of a drive housing assembly 104 and a drive screw assembly 155. Drive housing assembly 104 in turn comprises a pair of lugs or ears 105, 105', a drive housing 106 and a drive base 107, all made of stainless steel, and a bronze bushing 108 having a threaded bore. Drive screw assembly 155 comprises a drive screw 156 threadably coupled to the threaded bore of bushing 108, a thrust plate 157 and a bearing 158 which allows thrust plate 157 to rotate relative to drive screw 156. A plastic washer 159 is captured between the drive base 107 and the larger-diameter portion of the drive screw 156 to provide a cushion for the drive screw when it is lowered to a backseat position. This prevents the drive screw from being locked against the drive base due to overtightening.

Figure 5:
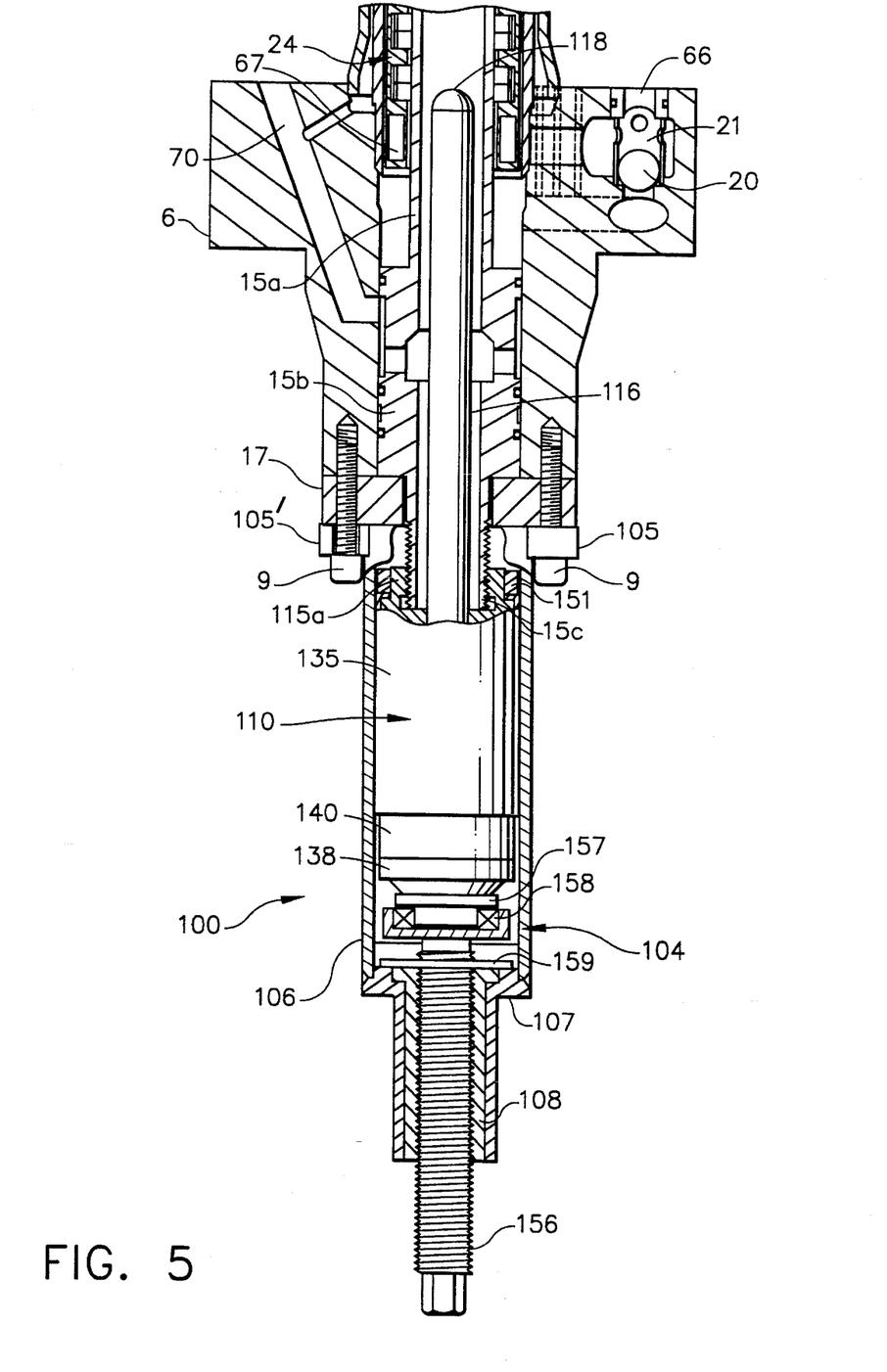
FIG. 5 is a sectional view of the lowermost portion of a conventional control rod drive with the position indicator probe assembly removed and an uncoupling tool with driver assembly installed in accordance with the present invention.

As best seen in FIG. 5, the driver assembly is attached to the CRD by means of lugs 105, 105' and ring flange cap screws 9. The probe assembly 110 is seated atop the thrust plate 157 and slides inside drive housing 106 along the CRD axis as drive screw 156 is turned. In accordance with one procedure for removing the CRD, the housing 12 and position indicator probe 12a are removed as a unit and then the piston nut 16 is removed. The uncoupling tool 110 is screwed onto the threaded end 15c of the piston tube as shown in FIG. 5. In this way the lock plug 94 (see FIG. 3) and the uncoupling tool are effectively coupled (i.e., via the piston tube 15 and the uncoupling rod 48).

The details of the structure of probe assembly 110 are shown in FIGS. 8, 9A, 9B and 10. The probe assembly comprises a probe 118 contained in a probe housing 116 connected to a frame base 115a. Frame base 115a has a threaded bore which screws onto the threaded end 15c of the piston tube 15. The two legs of a U-shaped frame member 115b extend from frame base 115a (see FIG. 8). A base 138 is bolted to the crosspiece of frame member 115b. Base 138 sits on the thrust plate 157 of the driver assembly 100 (see FIG. 5) during lifting of the piston tube assembly. Frame member 115b is the sole member transmitting the load exerted by the driver assembly from base 138 to frame base 115a.

Frame member 115b supports a battery holder and a printed circuit board 147, hereinafter referred to as the "CRD position module". A housing (not shown) and a lamp housing 140 are held between frame base 115a and tool base 138. A plurality of indicator lamps are electrically connected to CRD position module 147 and housed in lamp housing 140 in front of a pair of reflectors. The housing is provided with a window for inserting batteries into the battery holder. After battery insertion, a sleeve 135 is slid over the housing and O-ring seals and then locked into place by a threaded locking ring 151.

Figure 9A:
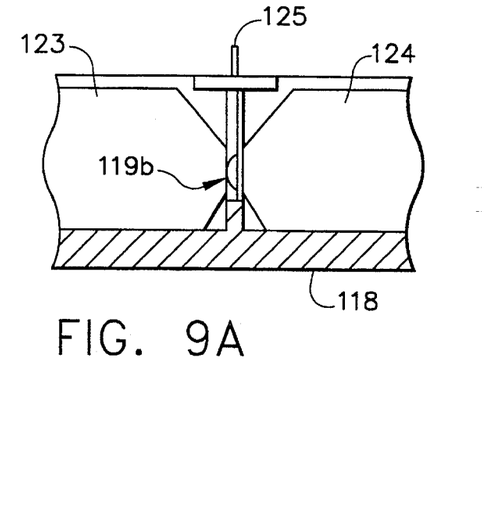
FIGS. 9A and 9B are axial and radial sectional views, respectively, of a portion of the probe whereat an analog position sensor is mounted.
Figure 9B:
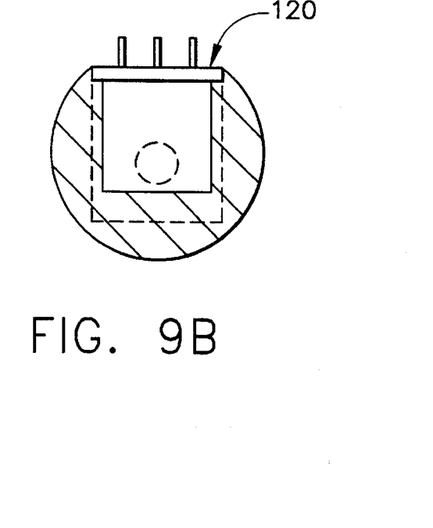
Figure 10:
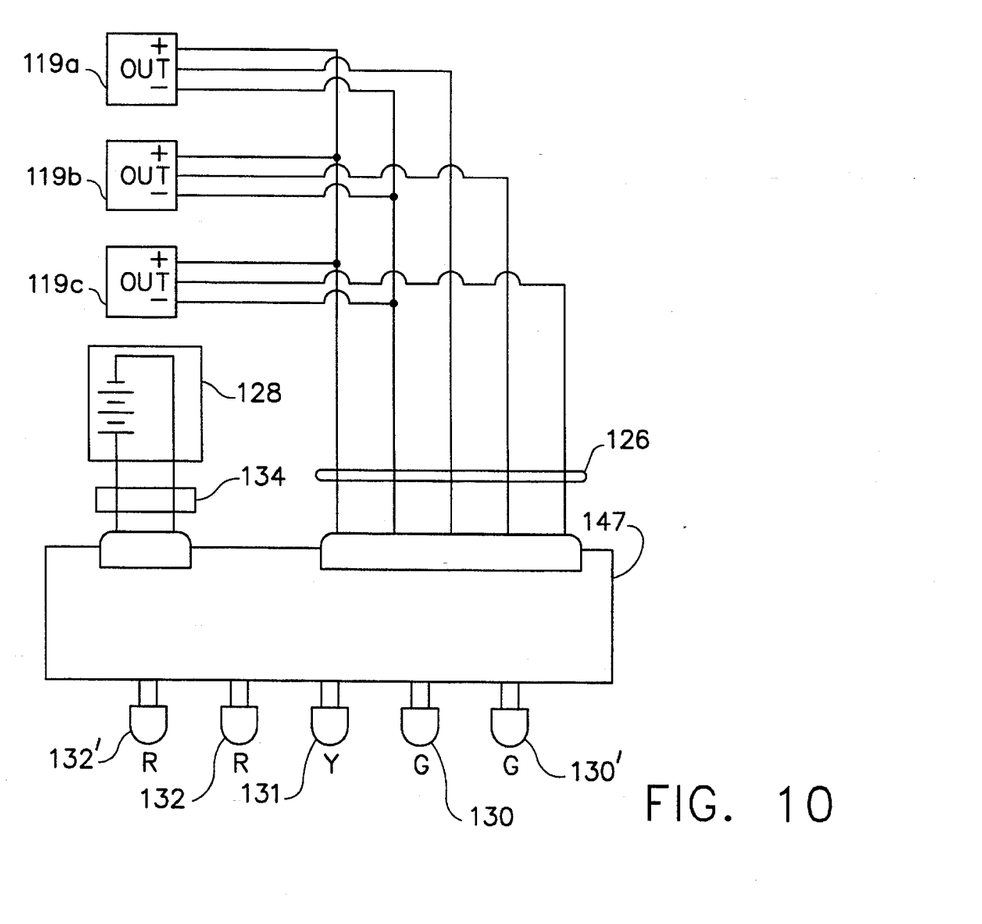
FIG. 10 is a diagram of the electronic circuitry incorporated in the probe assembly in accordance with the present invention.

The probe 118 has three analog position sensors 119a–c mounted between spacers such as spacers 123 and 124 shown in FIG. 9A. Sensors 119a–c are Hall effect transistors electrically connected via a five-pin connector 126 to CRD position module 147, as shown in FIG. 10. Each sensor outputs a voltage proportional to magnetic flux. The spacers are made of low-carbon steel and have truncated conical ends which focus the magnetic flux onto the adjacent sensor. Each analog position sensor comprises a hemispherical transistor with three electrodes all mounted on a substrate. These structural details are depicted in FIGS. 9A and 9B for sensor 119b. Sensors 119a and 119c have similar structures. The space surrounding each sensor is filled with a silicon compound and closed with a respective cover 120. Each cover is provided with three holes for passage of the three terminals of the Hall effect transistor. Wire 125 carries the transistor output to the CRD position module 147 via a channel formed between probe 118 and probe housing 116.

The output terminal which carries the analog position indication signal is connected to the CRD position module 147 as shown in FIG. 10. The CRD position module is programmed to compare the voltage output by each sensor with a respective threshold voltage and then selectively activate one of three indicators: a pair of green LEDs 130, 130', a yellow LED 131 or a red LED 132. An intermittently illuminated red LED 132' is used to indicate a low battery condition. The LEDs are visible through lamp housing 140, which is made of a polished transparent plastic, e.g., polycarbonate. Module 147 is powered via a two-pin connector 134 by batteries held in battery holder 128.

During upward travel of probe 118 relative to the drive piston 24, the top sensor 119a moves into proximity with the ring magnet 67 in magnet housing 24a. The voltage output by sensor 119a increases as the axial distance between the sensor and the centerline of the magnet decreases. When the sensor output voltage exceeds a predetermined threshold, module 147 turns on red LED 132. As the ring magnet is displaced downward during drive piston withdrawal and control rod uncoupling, the voltage output by sensor 119b increases. However, as long as the output of sensor 119a remains above its threshold, module 147 will continue to illuminate the red LED, i.e., if sensors 119a and 119b are both outputting voltages which exceed their respective thresholds, then module 147 is programmed to give the red indicator precedence. Only when the output of sensor 119a falls below its threshold and the output of sensor 119b remains above its threshold will the red LED 132 be switched off and yellow LED 131 be switched on. As the magnet housing is displaced further downward during drive piston withdrawal, the voltage output by sensor 119c will eventually exceed its respective threshold. If sensors 119b and 119c are both outputting voltages which exceed their respective thresholds, then module 147 is programmed to give the green indicator precedence by turning off the yellow LED and turning on a pair of green LEDs 130, 130'. (Two green LEDs are provided in order to increase the intensity of the green indicator.) Thus, the yellow LED is illuminated only if sensor 119b is outputting a voltage above its threshold and sensors 119a and 119c are both outputting voltages below their respective thresholds.

A continuously illuminated red LED indicates the control rod is in the "full out" position; the illuminated green LEDs indicate the control rod is in the "overtravel" position, i.e., is uncoupled; and an illuminated yellow LED indicates that the control rod is in a "transition" position therebetween. Since the limit of drive piston down travel is provided by the backseat position of the control rod in its associated reactor vessel guide tube (not shown), switch 119c is closed only when the control rod and CRD are uncoupled and, when closed, provides an annunciation of this condition. This condition indicates that the CRD can be safely removed from the CRD housing.

Red LED 132' will illuminate intermittently in response to detecting a low battery condition even when probe assembly 110 is not installed on threaded end 15c of the piston tube.

The particular driver assembly disclosed above is not required in order to utilize the probe assembly. Any conventional means for bearing against base 138 and lifting the probe assembly and the piston tube assembly connected thereto can be used in place of the driver assembly. For example, a conventional tool known as a "pogo stick" can be used to uncouple the control rod by lifting the probe assembly.

The preferred embodiment has been disclosed for the purpose of illustration. Variations and modifications of the disclosed structure which do not depart from the concept of this invention will be apparent to mechanical engineers skilled in the art of control rod drive tools. All such variations and modifications are intended to be encompassed by the claims set forth hereinafter.

We claim:

1. A probe for detecting the axial position of a magnet relative to an axis of said probe, comprising a first analog position sensor arranged at a first axial position along said probe axis, said first analog position sensor outputting a voltage signal which varies as a function of the axial distance between said first analog position sensor and said magnet, and means for focusing magnetic flux from said magnet onto said first analog position sensor, said magnetic flux focusing means being arranged along said probe axis adjacent said first analog position sensor.

2. The probe as defined in claim 1, wherein said first analog position sensor means comprises a Hall effect transistor.

3. The probe as defined in claim 1, wherein said magnetic flux focusing means comprises a cylindrical piece of low-carbon steel having an end shaped as a truncated cone.

4. The probe as defined in claim 1, further comprising second and third analog position sensors respectively arranged at second and third axial positions along said probe axis, each of said second and third said first analog position sensor outputting a voltage signal which varies as a function of the axial distance between said respective second or third analog position sensor and said magnet.

5. The probe as defined in claim 4, further comprising second and third means for focusing magnetic flux from said magnet onto said second and third analog position sensors respectively, said second and third magnetic flux focusing means being arranged along said probe axis adjacent said second and third analog position sensors respectively.

6. A probe assembly comprising a probe as defined in claim 4, first, second and third selectively activatable indicators, processing means connected to receive the voltage signals output from said first, second and third analog position sensors and selectively activate one of said first, second and third indicators in accordance with a protocol, and means for supporting said probe, said first, second and third indicators, and said processing means.

7. The probe assembly as defined in claim 6, wherein said first indicator comprises an first LED having a first color, said second indicator comprises a second LED having a second color different than said first color, and said third indicator comprises a third LED having a third color different than said first and second colors, and wherein said protocol comprises activating said first LED only if the voltage signal output from said first analog position sensor is greater than a first predetermined threshold, activating said third LED only if the voltage signal output from said third analog position sensor is greater than a third predetermined threshold, and activating said second LED only if the voltage signal output from said second analog position sensor is greater than a second predetermined threshold and the voltage signals output from said first and third analog position sensors are less than said first and third predetermined thresholds respectively.

8. The probe assembly as defined in claim 6, further comprising a base supported by supporting means, said base having a centerline axis which is coaxial with said probe axis, and means for attaching said supporting means to a threaded end of a piston tube in a control rod drive.

9. An uncoupling tool comprising a probe assembly as defined in claim 6 and a driver assembly, said driver assembly in turn comprising a drive screw, a thrust plate, a bearing for rotatably coupling said thrust plate to said drive screw assembly, threaded means for supporting said drive screw and means for attaching said threaded means to a ring flange of said control rod drive, said probe assembly being lifted by the force transmitted by said thrust plate in response to rotation of said drive screw.

10. A tool for uncoupling a control rod from a control rod drive which has its position indicator probe removed, comprising first, second and third Hall effect transistors arranged along a tool axis, first, second and third selectively activatable indicators, processing means connected to receive respective voltage signals from said first, second and third Hall effect transistors and selectively activate one of said first, second and third indicators as a function of the voltage signals from said first, second and third Hall effect transistors, first support means for supporting said first, second and third Hall effect transistors along said tool axis, second support means for supporting said first, second and third indicators and said processing means, said first support means being connected to said second support means, and first attachment means for attaching said second support means to an end of a piston tube in the control rod drive, whereby said first, second and third Hall effect transistors are fixed relative to said piston tube at respective axial positions inside the piston tube.

11. The uncoupling tool as defined in claim 10, further comprising means for focusing magnetic flux from said magnet onto said first Hall effect transistor.

12. The uncoupling tool as defined in claim 11, wherein said magnetic flux focusing means comprises a cylindrical piece of low-carbon steel having an end shaped as a truncated cone.

13. The uncoupling tool as defined in claim 12, wherein said processing means activates said first indicator if the voltage signal output from said first Hall effect transistor is greater than a first predetermined threshold, activates said third indicator if the voltage signal output from said third Hall effect transistor is greater than a third predetermined threshold and activates said second indicator if the voltage signal output from said second Hall effect transistor is greater than a second predetermined threshold and the voltage signals output from said first and third Hall effect transistors are respectively less than said first and third predetermined thresholds, said first, second and third predetermined thresholds being set such that said first indicator is activated when the control rod is in its "full out" position, said third indicator is activated when the control rod is uncoupled from the control rod drive, and said second indicator is activated when the control rod is in a transition position between the "full out" and uncoupled positions.

14. The uncoupling tool as defined in claim 12, wherein said first indicator comprises an first LED having a first color, said second indicator comprises a second LED having a second color different than said first color, and said third indicator comprises a third LED having a third color different than said first and second colors.

15. The uncoupling tool as defined in claim 10, further comprising means for raising said first attachment means, and second attachment means for attaching said raising means to said control rod drive such that said piston tube is raised in unison with said first attachment means.

16. A tool for uncoupling a control rod from a control rod drive which has its position indicator probe removed, which has a magnet housing coupled to a control rod by way of an index tube and a spud, and which has a piston tube which must be displaced upward relative to the magnet housing to uncouple the control rod, comprising:

first, second and third analog position sensors respectively arranged at first, second and third positions along an axis, each of said analog position sensors outputting a voltage signal which varies as a function of the axial distance between said respective analog position sensor and said magnet;

first, second and third selectively activatable indicator lamps;

processing means connected to receive voltage signals from said first, second and third analog position sensors and then activate said first indicator if the voltage signal output from said first analog position sensor is greater than a first predetermined threshold, activate said third indicator if the voltage signal output from said third analog position sensor is greater than a third predetermined threshold, and activate said second indicator if the voltage signal output from said second analog position sensor is greater than a second predetermined threshold and the voltage signals output from said first and third analog position sensors are respectively less than said first and third predetermined thresholds;

means for supporting said analog position sensors, said indicators and said processing means; and first attachment means for attaching said supporting means to an end of the piston tube, wherein said first, second and third predetermined thresholds are set such that said first indicator is activated when the control rod is in its "full out" position, said third indicator is activated when the control rod is uncoupled from the control rod drive, and said second indicator is activated when the control rod is in a transition position between the "full out" and uncoupled positions.

17. The uncoupling tool as defined in claim 16, wherein said supporting means are configured such that said first, second and third analog position sensors are spaced along a centerline axis of said piston tube, further comprising means for raising said first attachment means, and second attachment means for attaching said raising means to said control rod drive such that said piston tube is raised in unison with said first attachment means.

* * * * *